US009803569B2

(12) United States Patent
Ohmura et al.

(10) Patent No.: US 9,803,569 B2
(45) Date of Patent: Oct. 31, 2017

(54) INTERNAL COMBUSTION ENGINE START CONTROL DEVICE AND CONTROL METHOD

(71) Applicant: NISSAN MOTOR CO., LTD., Yokohama-shi, Kanagawa (JP)

(72) Inventors: Yasushi Ohmura, Tokyo (JP); Hiroshi Arakawa, Kanagawa (JP)

(73) Assignee: NISSAN MOTOR CO., LTD., Yokohama-shi, Kanagawa (JP)

( * ) Notice: Subject to any disclaimer, the term of this patent is extended or adjusted under 35 U.S.C. 154(b) by 171 days.

(21) Appl. No.: 14/372,863

(22) PCT Filed: Jan. 17, 2013

(86) PCT No.: PCT/JP2013/050751
§ 371 (c)(1),
(2) Date: Jul. 17, 2014

(87) PCT Pub. No.: WO2013/108813
PCT Pub. Date: Jul. 25, 2013

(65) Prior Publication Data
US 2014/0379239 A1    Dec. 25, 2014

(30) Foreign Application Priority Data
Jan. 19, 2012  (JP) ................................. 2012-009025

(51) Int. Cl.
*F02D 41/00* (2006.01)
*F02D 29/02* (2006.01)
(Continued)

(52) U.S. Cl.
CPC ......... *F02D 41/0002* (2013.01); *B60W 10/02* (2013.01); *B60W 10/06* (2013.01);
(Continued)

(58) Field of Classification Search
CPC ....... B60W 10/02; B60W 10/06; F02D 29/02; F02D 41/0002; F02D 41/062;
(Continued)

(56) References Cited

U.S. PATENT DOCUMENTS 4,987,871 A * 1/1991 Nishikawa ............ F02D 41/061
                                                      123/179.18
6,009,371 A * 12/1999 Kobayashi ............. B60K 6/445
                                                      123/339.19
(Continued)

FOREIGN PATENT DOCUMENTS

JP    H01-240749 A    9/1989
JP    H09-144586 A    6/1997
JP    2007-092711 A    4/2007

*Primary Examiner* — Carlos A Rivera
*Assistant Examiner* — Carl Staubach
(74) *Attorney, Agent, or Firm* — Drinker Biddle & Reath LLP

(57) ABSTRACT

An internal combustion engine 2 is started by being cranked by an electric motor. An internal combustion engine start control device performs a feedback-control of an intake air amount of the internal combustion engine to a target idle intake air amount, learns a feedback correction amount applied in a feedback control, and performs a learning control using a learnt value in parallel with the feedback control. An engine rotation speed is converged to a target idle rotation speed in an early stage by setting an allowable correction range of a feedback correction amount applied before a start of learning of the intake air amount wider than the allowable correction range of the feedback correction amount applied after the start of the learning of the intake air amount.

7 Claims, 3 Drawing Sheets

(51) Int. Cl.
  *F02D 41/06*  (2006.01)
  *F02D 41/18*  (2006.01)
  *B60W 10/02*  (2006.01)
  *B60W 10/06*  (2006.01)
  *F02D 41/24*  (2006.01)
  *F02D 41/08*  (2006.01)
  *F02N 15/02*  (2006.01)

(52) U.S. Cl.
  CPC ........... *F02D 29/02* (2013.01); *F02D 41/062* (2013.01); *F02D 41/18* (2013.01); *F02D 41/2451* (2013.01); *F02D 41/08* (2013.01); *F02N 15/022* (2013.01); *Y02T 10/42* (2013.01)

(58) Field of Classification Search
  CPC ...... F02D 41/08; F02D 41/18; F02D 41/2451; F02D 41/061; F02D 41/06; F02D 41/2461; F02N 15/022; Y02T 10/42
  USPC ............... 701/103, 113; 123/179.16, 179.18, 123/339.1, 339.12, 339.14–339.16, 123/339.19–339.21, 376, 403, 683, 685
  See application file for complete search history.

(56) References Cited

U.S. PATENT DOCUMENTS

| | | | |
|---|---|---|---|
| 6,223,719 B1* | 5/2001 | Yano | F02D 11/105 123/339.14 |
| 6,338,331 B1* | 1/2002 | Watanabe | F02D 33/02 123/179.18 |
| 6,505,594 B1* | 1/2003 | Katayama | F02D 31/002 123/179.18 |
| 6,814,035 B2* | 11/2004 | Eiraku | F01L 1/022 123/395 |
| 7,080,627 B2* | 7/2006 | Watanabe | F02D 11/105 123/339.14 |
| 7,270,119 B2* | 9/2007 | Mitsutani | F02D 41/1482 123/674 |
| 2008/0022957 A1* | 1/2008 | Trask | F01L 9/04 123/179.3 |
| 2008/0275601 A1* | 11/2008 | Saito | B60K 6/48 701/22 |
| 2010/0324762 A1* | 12/2010 | Imaseki | B60K 6/36 701/22 |

* cited by examiner

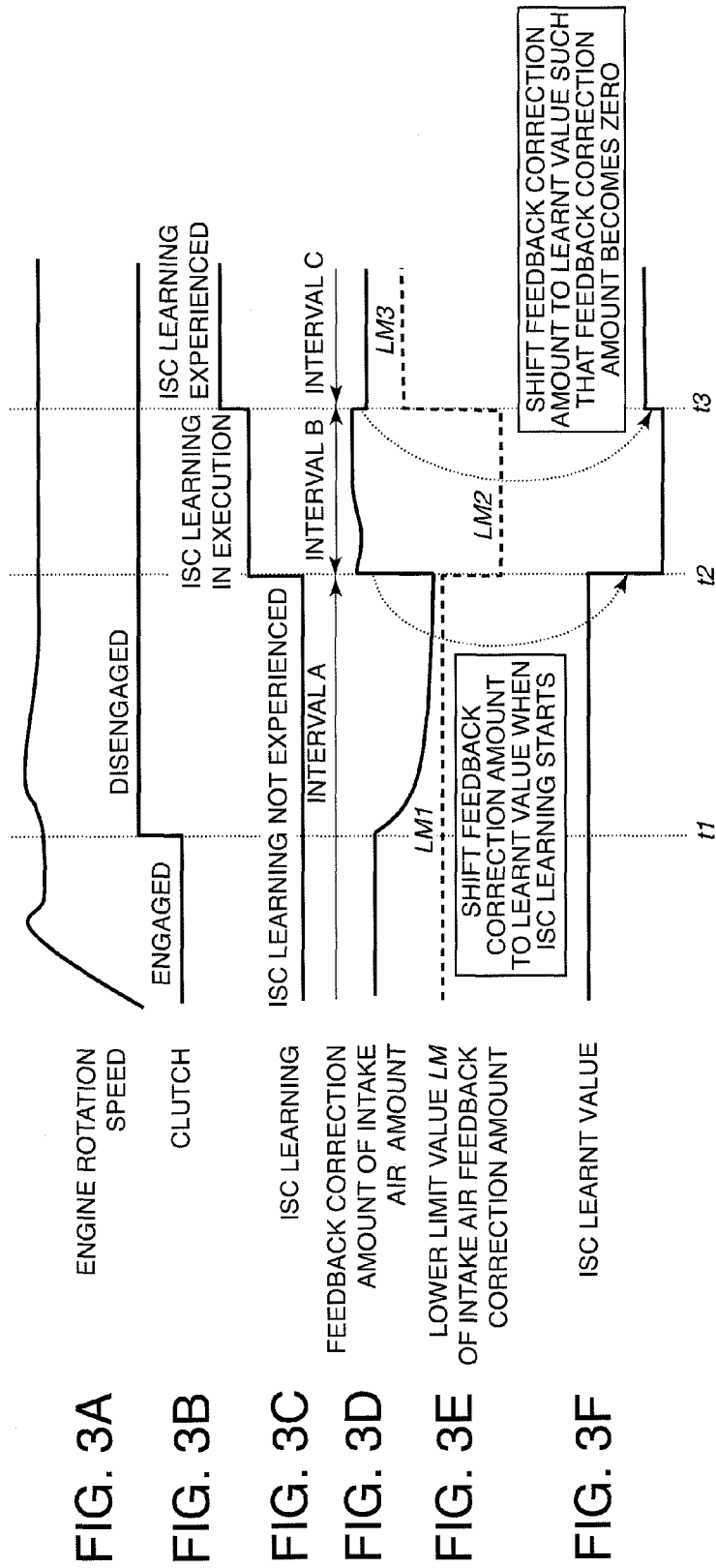

INTERNAL COMBUSTION ENGINE START CONTROL DEVICE AND CONTROL METHOD

TECHNICAL FIELD

This invention relates to a control of an intake air amount when an internal combustion engine is started.

BACKGROUND ART

In a hybrid drive vehicle in which an internal combustion engine is connected to an electric motor via a clutch, the electric motor cranks the internal combustion engine by connecting the clutch.

In an initial state of a factory shipment stage of a hybrid drive vehicle, an intake air amount of an internal combustion engine may not reach an amount equivalent to a target idle rotation speed due to product variations or high friction of the internal combustion engine immediately after manufacturing when the electric motor first starts the internal combustion engine.

If the intake air amount is below an amount necessary to meet the target idle rotation speed, there is a possibility that the internal combustion engine stalls without being able to maintain idle rotation when the clutch is disengaged after cranking and a rotational torque applied to the internal combustion engine by the electric motor disappears.

If the intake air amount is set to be slightly large in advance, an engine stall associated with the disengagement of the clutch can be prevented. In this case, however, a possibility of a rapid increase in an engine rotation speed after the disengagement of the clutch becomes higher.

Concerning the start of an internal combustion engine in a hybrid drive system, JP H09-144586A, published in 1997 by the Japan Patent Office, proposes a method for stabilizing a rotation speed of an internal combustion engine immediately after a start within a short time period. This method detects whether or not a feedback correction amount of an intake air amount of the internal combustion engine is limited by a limit value and changes the limit value or a learnt value if the feedback correction amount is limited by the limit value.

SUMMARY OF INVENTION

This prior art technique determines that the feedback correction amount is limited by the limit value if the feedback correction value stays at the limit value for a predetermined time.

It takes time to determine whether or not the feedback correction amount is limited by the limit value. Thus, it is difficult to apply this prior art technique to an intake air amount control during a short starting period from cranking until stable idle rotation is reached of the internal combustion engine in an initial state.

It is therefore an object of this invention to efficiently perform an intake air amount control during a starting period of an internal combustion engine in an initial state.

In order to achieve the above object, this invention provides an internal combustion engine start control device for starting an internal combustion engine by cranking the internal combustion engine by an electric motor. The device comprises a programmable controller programmed to perform a feedback-control of an intake air amount of the internal combustion engine to a target idle intake air amount, learn a feedback correction amount applied in the feedback control and perform a learning control of the intake air amount using a learnt value in parallel with the feedback control. The feedback correction amount is limited by an allowable correction range and the programmable controller is further programmed to set the allowable correction range applied before a start of learning wider than the allowable correction range applied after the start of the learning.

The details as well as other features and advantages of this invention are set forth in the remainder of the specification and are shown in the accompanying drawings.

BRIEF DESCRIPTION OF DRAWINGS

FIGS. 3A to 3F are timing charts showing results of the feedback correction allowable value setting routine.

DESCRIPTION OF EMBODIMENT

Figure 1:
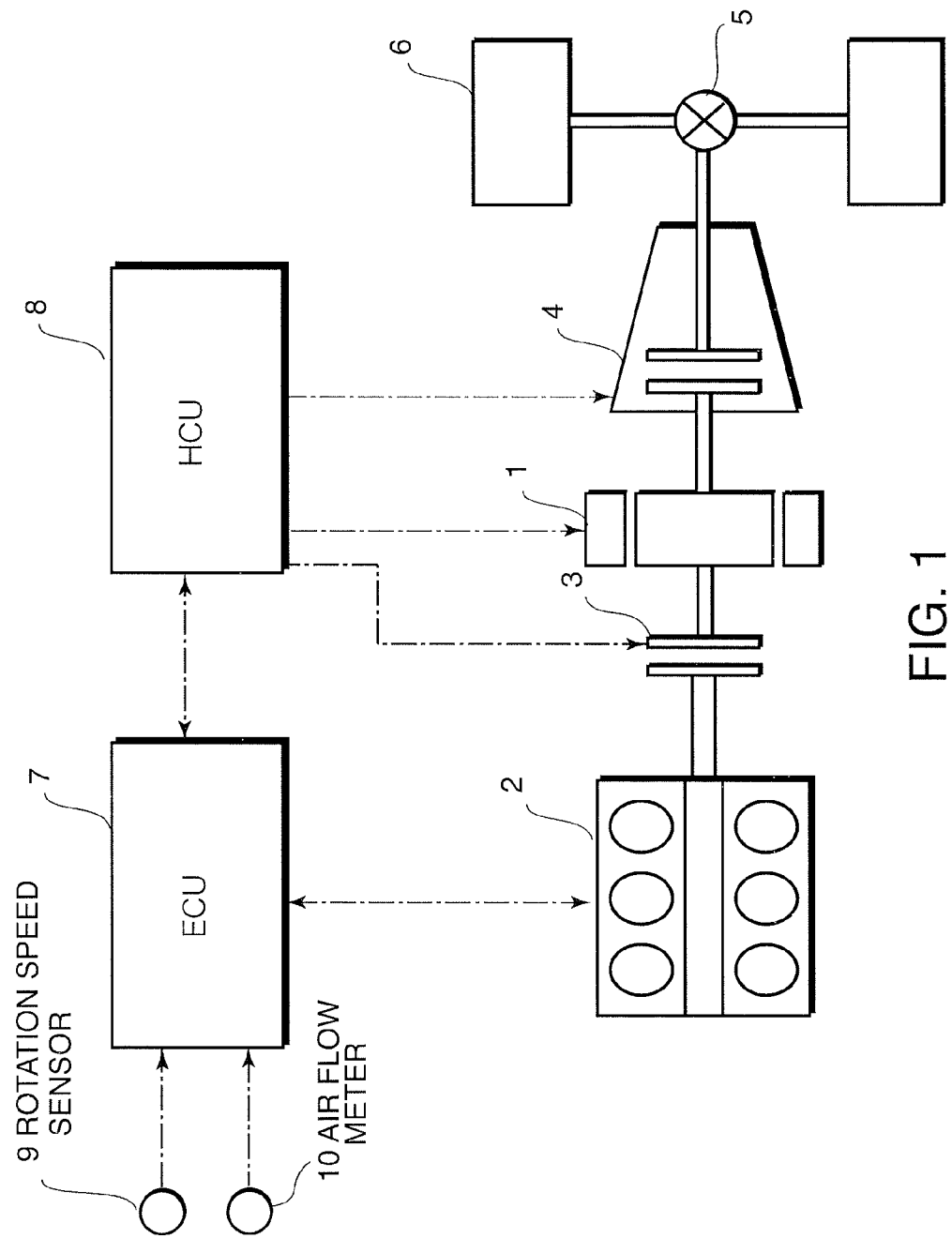
FIG. 1 is a schematic diagram of a hybrid drive vehicle and an internal combustion engine start control device according to an embodiment of this invention.

Referring to FIG. 1 of the drawings, a hybrid drive vehicle comprises an electric motor 1 and an internal combustion engine 2 as travel power sources.

The electric motor 1 is connected to drive wheels 6 of the hybrid drive vehicle via a transmission mechanism 4 comprising an automatic transmission and a clutch and a differential 5. The internal combustion engine 2 is connected to the electric motor 1 via a clutch 3.

The hybrid drive vehicle runs by transmitting a drive torque of the electric motor 1 to the drive wheels 6 via the transmission mechanism 4 and the differential 5 when the clutch 3 is disengaged. This travel mode is referred to as an EV mode.

On the other hand, when the clutch 3 is engaged, the internal combustion engine 2 is cranked and fuel is supplied to the internal combustion engine 2, whereby the internal combustion engine 2 starts. The internal combustion engine 2 after the start inputs a drive torque to the electric motor 1 via the clutch 3. As a result, the vehicle is caused to run by power of both the internal combustion engine 2 and the electric motor 1. This travel mode is referred to as an HEV mode.

The travel of the vehicle is controlled by a hybrid control unit (HCU) 8. Further, the operation of the internal combustion engine 2 is controlled by an engine control unit (ECU) 7.

Each of the ECU 7 and the HCU 8 is constituted by a microcomputer comprising a central processing unit (CPU), a read only memory (ROM), a random access memory (RAM) and an input/output interface (I/O interface). It is also possible to constitute the ECU 7 by a plurality of microcomputers. It is also possible to configure the HCU 8 by a plurality of microcomputers. Alternatively, it is also possible to configure the ECU 7 and the HCU 8 by a single microcomputer.

Control of the internal combustion engine 2 by the ECU 7 includes a feedback control and a learning control of an intake air amount of the internal combustion engine. For this purpose, a rotation speed sensor 9 for detecting a rotation speed of the internal combustion engine 2 and an air flow meter 10 for detecting the intake air amount of the same are connected to the ECU 7 via signal circuits.

The internal combustion engine 2 is started when fuel is supplied to the internal combustion engine 2 while the clutch 3 is engaged and the electric motor 1 cranks the internal combustion engine 2.

The ECU 7 controls the intake air amount and a fuel supply amount so that the rotation speed of the internal combustion engine 2 is quickly stabilized at an idle rotation speed after the start.

Specifically, the electric motor 1 cranks the internal combustion engine 2 with the clutch 3 engaged and the clutch 3 is disengaged after the complete explosion of the internal combustion engine 2. When the clutch 3 is disengaged, a rotational torque applied to the internal combustion engine 2 by the electric motor 1 disappears. From this state, the ECU 7 performs a feedback control and a learning control of the intake air amount of the internal combustion engine from the start so that the rotation speed of the internal combustion engine 2 is stabilized at a target idle rotation speed as quickly as possible. Changing an opening of a throttle not shown of the internal combustion engine 2 controls the intake air amount. The ECU 7 also controls the fuel supply amount to the internal combustion engine 2 in response to the intake air amount detected by the air flow meter 10.

When the internal combustion engine 2 is first started at the time of the shipment of the hybrid drive vehicle from a factory, an initial value is normally given as a learnt value of a feedback correction of the intake air amount. For example, an average value of learnt values in internal combustion engines of the same specifications is given as the initial value. However, due to product variations and high friction of the internal combustion engine 2 that has not undergone operation, it is unavoidable that a feedback correction amount becomes relatively large with respect the initial value of the learnt value.

If a limit value is provided for a correction amount concerning the feedback correction of the intake air amount, no farther correction of the intake air amount is performed after the feedback correction amount reaches the limit value. In such a case, the internal combustion engine 2 cannot reach the target idle rotation speed and the internal combustion engine 2 may stall after the clutch 3 is disengaged.

Figure 2:
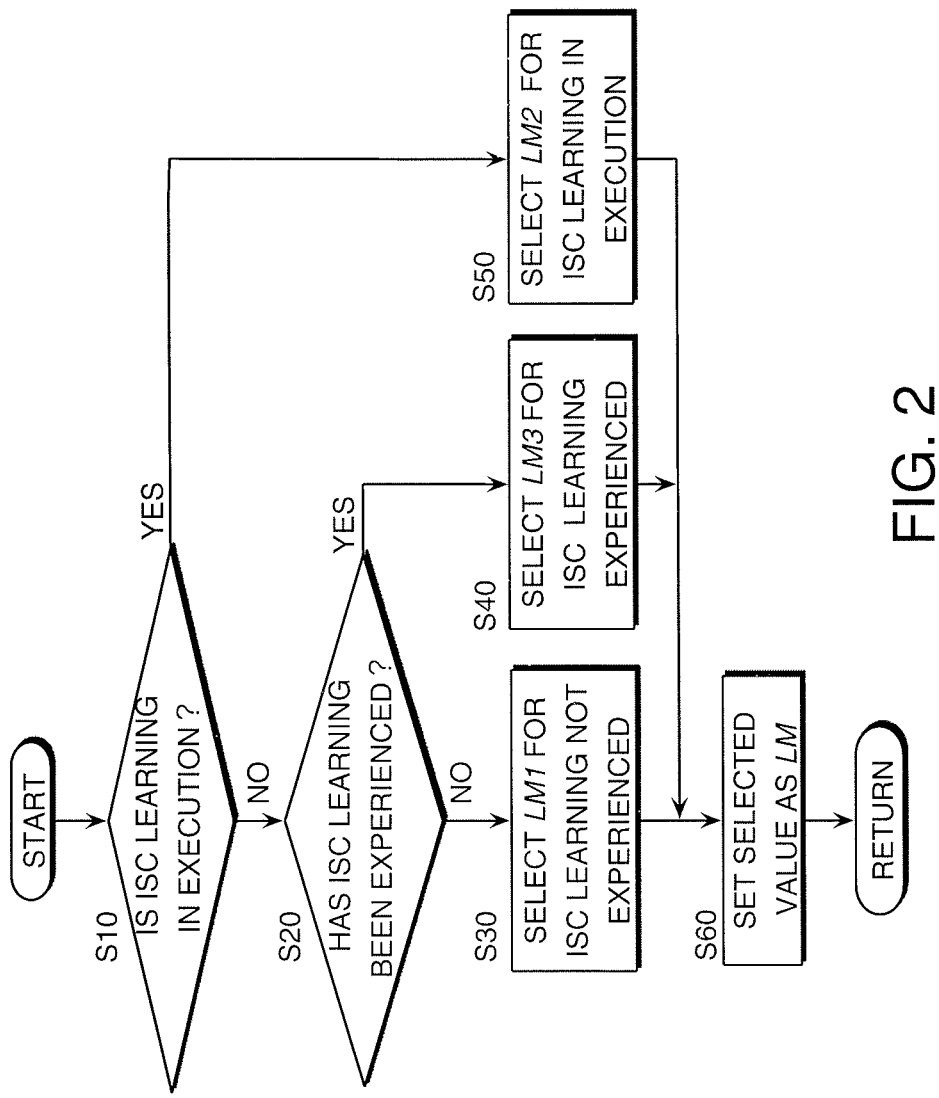
FIG. 2 is a flow chart describing a feedback correction allowable value setting routine of an intake air amount of an internal combustion engine performed by an engine controller according to the embodiment of this invention.

To efficiently control the internal combustion engine 2 after the disengagement of the clutch 3 to the target idle rotation speed by preventing such a problem, the ECU 7 performs a feedback correction allowable value setting routine of the intake air amount of the internal combustion engine shown in FIG. 2 in this internal combustion engine start control device. This routine is repeatedly performed at a constant time interval of, e.g. 10 milliseconds during a period until the internal combustion engine 2 is stopped immediately after being started.

Referring to FIG. 2, the ECU 7 determines in a step S10 whether or not the learning of an intake air amount correction value for an idle rotation speed control of the internal combustion engine 2 is in execution. The ECU 7 performs a feedback correction of the intake air amount based on a deviation between the target idle rotation speed and the rotation speed of the internal combustion engine 2 detected by the rotation speed sensor 9. The correction amounts of the intake air amount by this feedback correction are learnt for a fixed period. After the learning is completed, the learnt value is applied to the control of the intake air amount prior to the feedback correction on the next occasion of the start control of the internal combustion engine 2. The learning of the feedback correction amount of the intake air amount for the idle rotation speed control is hereinafter abbreviated as idle speed control (ISC) learning. Further, the learnt value obtained by the learning of the feedback correction amount is hereinafter abbreviated as an ISC learnt value.

In this internal combustion engine start control device, a set value greater in a direction to increase the intake air amount than the average value of ISC learnt values in internal combustion engines of the same specifications is given as an initial value of the ISC learnt value in advance. At the time of the shipment of the hybrid drive vehicle from the factory, the internal combustion engine 2 is, hence, started at a throttle opening equivalent to the initial value of the ISC learnt value, which is greater than the throttle opening equivalent to the average value of the ISC learnt values.

In a step S10, the ECU 7 determines whether or not the ISC learning is currently in execution. In other words, whether or not the current moment is within the fixed period described above is determined. Unless the learning is in execution, the ISC learning has been completed or not been experienced.

Unless the ISC learning is in execution, the ECU 7 determines in a step S20 whether or not the ISC learning has not been experienced.

If the learning has not been experienced, the ECU 7 selects a lower limit candidate value LM1 of the feedback correction amount in the case where the ISC learning has not been experienced in a step S30. Herein, the lower limit value means a maximum allowable reduction amount when the intake air amount is corrected to decrease. The lower limit value is expressed by a negative value.

On the other hand, if the determination of the step S20 is negative, i.e. if the ISC learning has been already experienced, the ECU 7 selects a lower limit candidate value LM3 of the feedback correction amount in the case where the ISC learning has been already experienced in a step S40. The lower limit candidate value LM1 selected in the step S30 is a value greater than the lower limit candidate value LM3 selected in the step S40.

On the other hand, if it is determined in the step S10 that the ISC learning is in execution, the ECU 7 selects a lower limit candidate value LM2 during the ISC learning in a step S50. The lower limit candidate value LM2 selected in the step S50 is a value even greater than the lower limit candidate value LM1 in the case where the ISC learning has not been experienced given in the step S30. The lower limit candidate value LM2 is set based on a known technique of enlarging upper and lower limit values of the feedback control during the ISC learning.

In a step S60, the ECU 7 sets the lower limit candidate value LM1 selected in the step S30, the lower limit candidate value LM3 selected in the step S30 or the lower limit candidate value LM2 selected in the step S50 as a lower limit value LM of the feedback correction amount. After the processing of the step S60, the ECU 7 finishes the routine.

The feedback correction and the learning correction of the intake air amount when the internal combustion engine 2 is started are performed based on the initial value of ISC learnt value set in advance to exceed the average value of the learnt values in the internal combustion engines of the same specifications and the lower limit value LM of the feedback correction amount determined as described above.

Referring to FIGS. 3A to 3F, the results of the above feedback correction allowable value setting routine of the intake air amount of the internal combustion engine will be described.

When the internal combustion engine 2 is started, the electric motor 1 is operated with the clutch 3 engaged, thereby cranking the internal combustion engine 2. Associated with cranking, air is aspirated into the internal combustion engine 2. The intake air amount is dependent on the opening of the throttle. Further, fuel corresponding to the intake air amount is supplied to the internal combustion engine 2.

In the internal combustion engine 2, an air-fuel mixture of the intake air and the fuel is ignited and burnt and the internal combustion engine 2 is rotated by combustion energy. At this point of time, the initial value of the learnt value set in advance to be greater than the average value of the ISC learnt values in the internal combustion engines of the same specifications is applied to the intake air amount control. Then, the cranking of the internal combustion engine 2 is started at the throttle opening corrected in accordance with the initial value of the learnt value.

The clutch 3 is disengaged at a time t1 after the complete explosion of the internal combustion engine 2. As a result, the rotational torque applied to crank the internal combustion engine 2 by the electric motor 1 disappears. Thereafter, the ECU 7 starts the feedback control and the learning control of the intake air amount so that the rotation speed of the internal combustion engine 2 rotating by itself is stabilized at the target idle rotation speed in an early stage.

It should be noted that since the feedback control and the learning control of the intake air amount are both known techniques, methods of these controls are not described here.

In the following description, an interval from the start of the cranking of the internal combustion engine 2 to a time t2 at which the learning of the feedback correction is started is referred to as an interval A. Further, an interval from time t2 to a time t3 at which the learning of the feedback correction of the intake air amount is completed is referred to as an interval B. Further, an interval after time t3 is referred to as an interval C.

By the execution of the feedback correction allowable value setting routine of FIG. 2, the lower limit candidate value LM1 selected in the step S30 is given as the lower limit value LM of the correction value for the feedback correction of the intake air amount in the interval A. In the interval B, the lower limit candidate value LM2 selected in the step S50 is given as the lower limit value LM of the correction amount. In the interval C, the lower limit candidate value LM3 selected in the step S40 is given as the lower limit value LM of the correction amount.

The lower limit candidate value LM1 of the feedback correction of the intake air amount in the learning unexperienced interval A is a value greater than the lower limit candidate value LM3 given in the interval C after the completion of the learning. The throttle opening when cranking is started is kept at the throttle opening equivalent to the initial value of the learnt value exceeding the throttle opening equivalent to the average value of the learnt values as described above. The internal combustion engine 2 is easily started by performing cranking with the throttle opening set to be slightly large in this way, i.e. by setting the intake air amount to be slightly large. Also in the interval A, the feedback correction of the intake air amount is not performed in an interval from the start of cranking to the time t1 at which the clutch 3 is disengaged. That is, the feedback correction amount of the intake air amount is equivalent to zero before the time shown in FIG. 3D.

When the clutch 3 is disengaged at the time t1 after the complete explosion of the internal combustion engine 2, the ECU 7 starts the feedback control of the intake air amount to stabilize the rotation speed of the internal combustion engine 2 at the target idle rotation speed in an early stage. In this internal combustion engine start control device, a value greater than the average value of the ISC learnt values in the internal combustion engines of the same type is given as the initial value of the ISC learnt value in advance. Thus, the intake air amount is slightly large, with the result that the feedback correction of the intake air amount is a correction to reduce the intake air amount as shown in FIG. 3D.

Although the lower limit candidate value LM1 selected in the step S30 is applied as the lower limit value LM in the interval A, the lower limit candidate value LM1 is set greater than the lower limit candidate value LM3 of the interval C. Thus, the feedback correction is performed without reaching the lower limit value LM. It should be noted that all of the lower limit candidate values LM1, LM2 and LM3 shown in FIG. 3E are negative values. The expression that the lower limit candidate value LM1 is greater than the lower limit candidate value LM3 means that the absolute value of LM1 is greater than that of LM3.

At the time t2, the engine rotation speed is substantially stabilized at the target rotation speed. Accordingly, the ECU 7 starts the learning of the feedback correction amount, i.e. the ISC learning at the time t2. The ISC learning is performed by setting the learnt value equal to the feedback correction amount at the start of the learning, i.e. at the time t2. During a feedback correction period from the time t1 to the time t2 of the interval A, the feedback correction amount is reduced as shown in FIG. 3D. Thus, the learnt value given for the ISC learning in the interval B is a value drastically smaller than the initial value given in the interval A.

Since the learning of the feedback correction amount in the interval B is performed based on the reduced learnt value, the feedback correction amount has a value approximate to zero during a learning period. On the other hand, the lower limit value LM of the feedback correction of the intake air amount set in the feedback correction allowable value setting routine of FIG. 2 is set equal to LM2 having the largest value. This is the setting based on a known method of enlarging the upper and lower limit values of the feedback correction during learning. Thus, the feedback correction amount does not reach the lower limit value LM also in the interval B during the learning period.

At time t2, the ECU 7 completes the ISC learning. In the succeeding interval C, the feedback control of the intake air amount is performed in parallel with the learning control based on the learnt value obtained by the ISC learning. Since the feedback correction is performed in the interval C by giving the ISC learnt value obtained by the ISC learning in the interval B in advance, the feedback correction amount is further reduced as compared with the interval A in which the feedback correction is performed based on the initial value of the ISC learnt value and the interval B during the ISC learning. Thus, even if the lower limit value LM of the feedback correction is set equal to the smallest lower limit candidate value LM3 in the execution of the routine of FIG. 2, a feedback control amount is not limited by the lower limit value LM.

As described above, this internal combustion engine start control device quickly performs the feedback correction regardless of whether or not the initial value of the learnt value is set by making an allowable correction range of the feedback correction amount during a period from the start of the cranking of the internal combustion engine to the start of the learning control to learn the intake air amount larger than an allowable correction range of the feedback correction amount after the completion of the learning for the control of the intake air amount of the internal combustion engine. Thus, the intake air amount of the internal combustion engine can be accurately stabilized in an early stage without dependence on characteristic variations relating to the intake air amount of the internal combustion engine.

In the embodiment described above, the present invention is applied to a drive system of the hybrid drive vehicle. By applying this invention to the hybrid drive vehicle in this way, the intake air amount can be efficiently and precisely stabilized even for the hybrid drive vehicle at the time of shipment which is unexperienced with the learning control.

In the embodiment described above, the ECU 7 of the hybrid drive vehicle performs the ISC learning. However, it is also preferable to perform the ISC learning using an external controller before the shipment of the manufactured hybrid drive system or hybrid drive vehicle from a factory. In this case, the external controller sets a learnt value obtained by the ISC learning as an initial value of the ISC learnt value of the ECU 7 of the hybrid drive system. By this configuration, the trouble of programming the feedback correction allowable value setting routine of FIG. 2 in the ECU 7 of each hybrid drive system can be saved.

Further, also in the case of a need to exchange the ECU 7 of the hybrid drive vehicle after shipment, the already obtained initial value of the ISC learnt value may be set in a new ECU 7.

In the embodiment described above, by applying this invention to such a hybrid drive system including the clutch 3 for connecting the electric motor 1 to the internal combustion engine 2 and configured such that the internal combustion engine start control device cranks the internal combustion engine 2 by the electric motor 1 in the engaged state of the clutch 3 and the clutch 3 is disengaged at a predetermined timing after the start of the internal combustion engine 2, the stall of the internal combustion engine 2 can be reliably prevented when the rotational torque applied to the internal combustion engine 2 by the electric motor 1 disappears by disengaging the clutch 3.

In the embodiment described above, in the initial state of the internal combustion engine start control device, the learning control increases the initial value of the learnt value of the intake air amount given during a period until the learning of the intake air amount is started and enlarges the allowable correction range of the feedback correction amount during the period from the start of the cranking to the start of the learning control to learn the intake air amount to reduce the intake air amount. This can prevent a stall at the time of starting the internal combustion engine and control the engine rotation speed to the target idle rotation speed in an early stage by suppressing the rapid increase in a rotation speed of the internal combustion engine after complete explosion even if the intake air amount of the internal combustion engine in the initial state varies.

The contents of Tokugan 2012-009025, with a filing date of Jan. 19, 2012 in Japan, are hereby incorporated by reference.

Although the invention has been described above with reference to a certain embodiment, the invention is not limited to the embodiment described above. Modifications and variations of the embodiment described above will occur to those skilled in the art, within the scope of the claims.

For example, a reduction allowable value of the intake air amount is shifted toward a reduction side in the embodiment described above. However, depending on performance variations at the shipment stage of the internal combustion engine, the intake air amount may be still feedback-controlled to increase even if the initial value of the learnt value is increased. Accordingly, it is preferable not only to shift the reduction allowable value of the feedback correction amount toward the reduction side, but also to shift an increase allowable value toward an increase side during the period from the start of the cranking to the start of the learning control to learn the intake air amount.

INDUSTRIAL FIELD OF APPLICATION

This invention provides a particularly favorable effect in the control of an internal combustion engine of a hybrid drive vehicle in which the internal combustion engine is started and stopped during vehicle running.

The embodiments of this invention in which an exclusive property or privilege is claimed are defined as follows:

The invention claimed is:

1. An internal combustion engine start control device for starting an internal combustion engine by cranking the internal combustion engine by an electric motor, comprising:
  a programmable controller programmed to:
    perform a feedback-control of an intake air amount of the internal combustion engine to a target idle intake air amount;
    learn a feedback correction amount applied in the feedback control; and
    perform a learning control of the intake air amount using a learnt value in parallel with the feedback control;
  wherein the feedback correction amount is limited within an allowable correction range set by the programmable controller, and
  wherein setting the allowable correction range comprises:
    responsive to determining that the learning has not yet started, setting a first allowable correction range;
    responsive to determining that the learning is being performed, setting a second allowable correction range; and
    responsive to determining that the learning is complete, setting a third allowable correction range,
    wherein the second allowable correction range is wider than the first allowable correction range, and the first allowable correction range is wider than the third allowable correction range.

2. The internal combustion engine start control device according to claim 1, wherein the electric motor and the internal combustion engine constitute a drive system for a hybrid drive vehicle.

3. The internal combustion engine start control device according to claim 2, wherein the programmable controller is provided independently of the drive system.

4. The internal combustion engine start control device according to claim 2, wherein the drive system further includes a clutch for connecting the electric motor to the internal combustion engine, and the programmable controller is further programmed to crank the internal combustion engine by the electric motor in an engaged state of the clutch and disengage the clutch at a predetermined timing after the start of the internal combustion engine.

5. The internal combustion engine start control device according to claim 1, wherein the programmable controller is further programmed to:
  when the internal combustion engine start control device is in an initial state, apply an increased value as an initial value of the learnt value prior to the start of the learning of the intake air amount and the first allowable correction range is set to decrease the intake air amount during a period from a start of cranking until the start of learning.

6. An internal combustion engine start control device for starting an internal combustion engine by cranking the internal combustion engine by an electric motor, comprising:
   means for performing a feedback-control of an intake air amount of the internal combustion engine to a target idle intake air amount;
   means for learning a feedback correction amount applied in a feedback control; and
   means for performing a learning control of the intake air amount using a learnt value in parallel with the feedback control;
   wherein the feedback correction amount is limited by an allowable correction range, and
   wherein,
      before a start of learning, a first allowable correction range is set as the allowable correction range,
      while the learning is being performed, a second allowable correction range is set as the allowable correction range, and
      after the learning is completed, a third allowable correction range is set as the allowable correction range,
      wherein the second allowable correction range is wider than the first allowable correction range, and the first allowable correction range is wider than the third allowable correction range.

7. An internal combustion engine start control method for starting an internal combustion engine by cranking the internal combustion engine by an electric motor, comprising:
   performing a feedback-control of an intake air amount of the internal combustion engine to a target idle intake air amount;
   learning a feedback correction amount applied in the feedback control; and
   performing a learning control of the intake air amount using a learnt value in parallel with the feedback control;
   wherein the feedback correction amount is limited by an allowable correction range, and
   wherein,
      before a start of learning, a first allowable correction range is set as the allowable correction range,
      while the learning is being performed, a second allowable correction range is set as the allowable correction range, and
      after the learning is completed, a third allowable correction range is set as the allowable correction range,
      wherein the second allowable correction range is wider than the first allowable correction range, and the first allowable correction range is wider than the third allowable correction range.

\* \* \* \* \*